(12) United States Patent
Vora et al.

(10) Patent No.: US 11,274,166 B2
(45) Date of Patent: Mar. 15, 2022

(54) PROCESS FOR PREPARING HALOGENATED ISOBUTYLENE ISOPRENE RUBBER

(71) Applicant: RELIANCE INDUSTRIES LIMITED, Mumbai (IN)

(72) Inventors: Jayesh Prafullachandra Vora, Maharashtra (IN); Rakesh Singh, Uttar Pradesh (IN); Romal Ramkrushna Chafle, Maharashtra (IN); Padmavathi Garimella, Visakhapatnam (IN); Nitin Pal, Pharatpur (IN); Natalia Abramova, Togliatti (RU); Dmitry Khrichenko, Moscow (RU); Vadim Lishchinskiy, Moscow (RU)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 310 days.

(21) Appl. No.: 16/499,946

(22) PCT Filed: Apr. 9, 2018

(86) PCT No.: PCT/IB2018/052442
§ 371 (c)(1),
(2) Date: Oct. 1, 2019

(87) PCT Pub. No.: WO2018/189641
PCT Pub. Date: Oct. 18, 2018

(65) Prior Publication Data
US 2021/0130510 A1 May 6, 2021

(30) Foreign Application Priority Data

Apr. 12, 2017 (IN) .............................. 201621034855

(51) Int. Cl.
*C08F 10/10* (2006.01)
(52) U.S. Cl.
CPC ................................... *C08F 10/10* (2013.01)
(58) Field of Classification Search
CPC ...................................................... C08F 210/10
See application file for complete search history.

(56) References Cited

U.S. PATENT DOCUMENTS

| 3,009,904 A | 11/1961 | Serniuk et al. |
| 4,096,320 A | 6/1978 | Verde |

FOREIGN PATENT DOCUMENTS

| WO | WO-0185810 A1 * 11/2001 ............ C08F 210/12 |

OTHER PUBLICATIONS

ISR for International Application PCT/IB2018/052442.
Written Opinion for International Application PCT/IB2018/052442.

* cited by examiner

*Primary Examiner* — Catherine S Branch
(74) *Attorney, Agent, or Firm* — Ladas & Parry LLP

(57) ABSTRACT

The present disclosure relates to the field of rubbers. The halogenated isobutylene isoprene rubber is prepared by polymerizing isoprene monomer and isobutylene monomer, followed by halogenation using a halogenating agent. This process of the present disclosure is simple, energy efficient and economic.

10 Claims, No Drawings

PROCESS FOR PREPARING HALOGENATED ISOBUTYLENE ISOPRENE RUBBER

RELATED APPLICATION

This application is a national phase entry under 35 USC 371 of International Patent Application No.: PCT/IB2018/052442 filed on 9 Apr. 2018, which claims priority from Indian Application No. 201621034855 filed on 12 Apr. 2017, the disclosures of which are incorporated in their entirety by reference herein.

FIELD

The present disclosure relates to the field of rubbers.

Definitions

As used in the present disclosure, the following terms are generally intended to have the meaning as set forth below, except to the extent that the context in which they are used indicate otherwise.

Bottom fraction: During fractional distillation process, a portion or portions of a mixture distill out of die fractional distillation unit and is collected as top fraction/s, whereas another portion of the mixture does not distill and remains in the fractional distillation unit. This undistilled portion of the mixture exiting the lowermost end of the fractional distillation column is called the "bottom fraction".

BACKGROUND

Halogenated isobutylene isoprene rubber has versatile curing system, and better heat resistance. Hence, halogenated isobutylene isoprene rubber is widely used in applications such as the preparation of tire inner liners for tubeless tires, pharmaceutical stoppers, and heat resistant conveyor belts.

The process for preparation of halogenated isobutylene isoprene rubbers involves two reactions, first reaction is polymerization to obtain isobutylene isoprene rubber and second reaction is its halogenation. Conventional processes for preparing halogenated isobutylene isoprene rubbers are complex and involve numerous steps. Typically, after polymerization the isobutylene isoprene rubber is isolated by steam stripping in the forms of crumbs. The step of steam stripping separates the isobutylene isoprene rubber from impurities and fluid medium used for polymerization. The isolated isobutylene isoprene rubber crumbs need to be dissolved in suitable fluid medium before the step of halogenation. Due to the step of isolation by steam stripping and the step of dissolution in suitable fluid medium, the conventional processes incur higher cost of operation and labour. Further, the step of isolation by steam stripping requires high energy. Furthermore, steam stripping generates waste water that requires effluent treatment. Still further, due to the use of separate fluid media for polymerization and halogenation, the amount of fluid medium used is also high.

Thus, conventional processes are associated with drawbacks such as complex process, high energy consumption, high cost, and use of high amounts of fluid media.

There is, therefore, felt a need to provide a simple process for the preparation of halogenated isobutylene isoprene rubber that is energy efficient, economic and uses less amount of fluid medium.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a simple process for the preparation of halogenated isobutylene isoprene rubber.

Another object of the present disclosure is to provide an energy efficient and economic process for the preparation of halogenated isobutylene isoprene rubber.

Yet another object of the present disclosure is to provide process that use low amount of fluid medium.

Other objects and advantages of the present disclosure will be more apparent from the following description, which is not intended to limit the scope of the present disclosure.

SUMMARY

The present disclosure relates to a process for preparation of halogenated isobutylene isoprene rubber. The process comprises the following steps.

Isoprene monomer is polymerized in a first fluid medium with isobutylene monomer to obtain a first product mass comprising isobutylene isoprene rubber.

The polymerization is quenched by adding an alcohol to the first product mass to obtain a first resultant product mass. A second fluid medium is added to the first resultant product mass to obtain a second resultant product mass.

Water is added to the second resultant product mass with continuous stirring, and the second resultant product mass is allowed to stand to obtain a biphasic mixture comprising an organic phase and an aqueous phase. The organic phase comprises isobutylene isoprene rubber, the first fluid medium, unreacted isobutylene monomer, unreacted isoprene monomer, and the second fluid medium, and the aqueous phase comprises the alcohol. The organic phase is separated from the biphasic mixture.

The separated organic phase is fractionally distilled to obtain a bottom fraction comprising the isobutylene isoprene rubber, and the second fluid medium.

The isobutylene isoprene rubber present in the bottom fraction is halogenated by adding a halogenating agent and agitating to obtain a second product mass containing crude mixture comprising halogenated isobutylene isoprene rubber.

The crude mixture is subjected to the steps of washing, steam stripping, and drying to obtain halogenated isobutylene isoprene rubber.

DETAILED DESCRIPTION

Conventional processes for preparing halogenated isobutylene isoprene rubber are costly, laborious, and involve many steps. Typically, after polymerization, the isobutylene isoprene rubber is isolated in the forms of crumbs by steam stripping, which is carried out for separating the isobutylene isoprene rubber from impurities and fluid medium of polymerization. The isolated isobutylene isoprene rubber is dissolved in a fluid medium before the step of halogenation. The present disclosure envisages a simple, energy efficient, economic process that uses low amount of fluid medium.

In an aspect, the present disclosure provide a process for preparation of halogenated isobutylene isoprene rubber. The process comprises the following steps:

Isoprene monomer is polymerized in a first fluid medium with isobutylene monomer to obtain a first product mass comprising isobutylene isoprene rubber. The first product mass further comprises the first fluid medium, unreacted isobutylene monomer, and unreacted isoprene monomer.

The step of polymerization comprises introduction of isoprene monomer, and at least one first fluid medium in a reactor to obtain a first mass. The first mass is cooled to a predetermined low temperature to obtain a cooled first mass. Isobutylene monomer is introduced in the reactor and agitated the reaction mass while maintaining the predetermined low temperature to obtain a first product mass comprising isobutylene isoprene rubber.

In accordance with the embodiments of the present disclosure, the reaction mass further comprises at least one catalyst selected from the group consisting of diethylaluminum chloride, and ethylaluminum dichloride.

The first fluid medium is at least one selected from the group consisting of ethyl chloride, isopentane, and hexane.

The predetermined low temperature is in the range of −40° C. to −80° C.

The agitation of the cooled reaction mixture results in polymerization of isoprene monomer and isobutylene monomer to form isobutylene isoprene rubber. The isobutylene isoprene rubber remains dissolved in the first fluid medium.

The polymerization is quenched by adding an alcohol to the first product mass to obtain a first resultant product mass. A second fluid medium is added to the first resultant product mass to obtain a second resultant product mass.

In accordance with the embodiments of the present disclosure, the alcohol is at least one selected from the group consisting of methanol, and ethanol.

In an embodiment of the present disclosure, the second fluid medium is at least one selected from the group consisting of hexane, and isopentane.

In accordance with the embodiments of the present disclosure, the first fluid medium and the second fluid medium can be the same.

The second resultant product mass comprises isobutylene isoprene rubber dissolved in first fluid medium along with impurities such as unreacted monomers and alcohol. The amount of impurities such as unreacted monomers, and alcohol needs to be reduced before subjecting isobutylene isoprene rubber to halogenation.

Conventionally, the step of steam stripping is performed to separate impurities and fluid medium to obtain isobutylene isoprene rubber of desired purity. However, the step of steam stripping is an energy intensive step. Further, the step of steam stripping removes fluid medium and provides isobutylene isoprene rubber in the form of rubber crumbs. However, halogenation is carried out in solution phase. Therefore, the isobutylene isoprene rubber crumbs needs to be dissolved in a fluid medium before the step of halogenation. Thus, conventional process requires more energy and more fluid medium.

In the present disclosure, impurities are removed by (i) water washing to remove of water soluble impurities followed by (ii) fractional distillation to remove volatile impurities. The isobutylene isoprene rubber of desired purity obtained by the process of present disclosure is in the form of a solution in the second fluid medium. This solution can be directly used for halogenation.

Initially, water soluble impurities are removed from the resultant product mass with the help of water.

The step of separation involves addition of water to the second resultant product mass with continuous stirring and allowing the second resultant product mass to stand to obtain a biphasic mixture comprising an organic phase comprising isobutylene isoprene rubber, the first fluid medium, unreacted isobutylene monomer, unreacted isoprene monomer, and the second fluid medium and an aqueous phase comprising alcohol. When polymerization is carried out in the presence of a catalyst, during the step of separation the aqueous phase comprises the catalyst also. The organic phase is separated from the biphasic mixture. A settler vessel can be used to separate the aqueous phase from the organic phase. The resultant product mass is separated into an organic phase and an aqueous phase with the help of water.

Finally, volatile impurities are removed from the separated organic phase by using fractional distillation. The separated organic phase is fractionally distilled to obtain a bottom fraction comprising the isobutylene isoprene rubber and the second fluid medium. The distillate fraction comprises the unreacted isobutylene monomer, unreacted isoprene monomer and the first fluid medium. The distillate fraction comprising the unreacted monomer and the first fluid medium can be recycled.

The step of fractional distillation can be carried out at a temperature in the range of 30° C. to 150° C. and at a pressure in the range of 3 $kg/cm^2$ to 8 $kg/cm^2$.

Conventional process involves the step of dissolution of the isobutylene isoprene rubber crumbs, obtained after the step of steam stripping, in hexane. The dissolved isobutylene isoprene rubber in hexane is halogenated in the step of halogenation. In contrast, the step of dissolution of isobutylene isoprene is avoided in the process of the present disclosure. Overall, the process of the present disclosure consumes less energy and less fluid medium.

The unreacted monomers and fluid medium can be recycled to the first step of polymerization. Hence, the process of the present disclosure is simple, energy efficient, and economic.

The isobutylene isoprene rubber present in the bottom fraction is halogenated by adding a halogenating agent and agitating to obtain a second product mass containing crude mixture comprising halogenated isobutylene isoprene rubber and the second fluid medium.

In an embodiment of the present disclosure, the halogenating agent is at least one selected from the group consisting of bromine ($Br_2$), and chlorine gas.

The crude mixture is subjected to the steps of washing, steam stripping, and drying to obtain halogenated isobutylene isoprene rubber.

The step involves washing of the crude mixture with an aqueous alkali, and with water, followed by steam stripping the washed crude mixture to obtain a mixture comprising halogenated isobutylene isoprene rubber and water. In the step of steam stripping, the second fluid medium vaporizes. The vaporized second fluid medium can be recovered. The recovered second fluid medium and impurities can be reused.

In an embodiment of the present disclosure, the washing can be carried out with at least one aqueous alkali selected from the group consisting of sodium hydroxide, and potassium hydroxide.

The step of drying involves drying of the mixture of halogenated isobutylene isoprene rubber and water to obtain halogenated isobutylene isoprene rubber.

The process for preparation of halogenated isobutylene isoprene rubber further comprises compression of the halogenated isobutylene isoprene rubber into bales. The halogenated isobutylene isoprene rubber obtained by the process of present disclosure can be shaped into various other forms.

The halogenated isobutylene isoprene rubber obtained after steam stripping as well as in the step of drying can be in the form of crumbs.

The process of the present disclosure for preparing the halogenated isobutylene isoprene rubber is an integrated process, wherein the polymerization and halogenation are carried out without isolating the isobutylene isoprene rubber. On the contrary, in conventional processes the isobutylene isoprene rubber is isolated and then halogenated.

Conventional processes perform steam stripping operation twice; first after polymerization for isolation of isobutylene isoprene rubber and, second halogenation to isolate halogenated isobutylene isoprene rubber. On the contrary, the process of the present disclosure involves the step of steam stripping only after halogenation to isolated halogenated isobutylene isoprene rubber.

It is estimated that the process of the present disclosure for preparing the halogenated isobutylene isoprene rubber saves 5% to 6% of die total project capital expenditure (CAPEX) and 20% to 25% of total operating cost per year in terms of energy saved.

The process of the present disclosure for preparing the halogenated isobutylene isoprene rubber produces isobutylene isoprene rubber of the same quality as produced by the method involving isolating isobutylene isoprene rubber by steam stripping process as far as key properties such as mooney viscosity, % halogenation, and % volatiles are concerned.

Overall, the integrated process of the present disclosure is simple. The process also consumes less steam and therefore generates less waste water. The requirement of fluid medium is also lower as compared to the conventional processes.

Therefore, the process of the present disclosure is simple, energy efficient, economic, and environmentally friendly.

The present disclosure is further described in light of the following experiments which are set forth for illustration purpose only and not to be construed for limiting the scope of the disclosure. The following laboratory scale experiments can be scaled up to industrial/commercial scale and the results obtained can be extrapolated to industrial/commercial scale.

EXAMPLES

Example 1

Process for Preparing a Brominated Isobutylene Isoprene Rubber

A: Process for Polymerization

In a reactor, isoprene monomer (0.1 kg) and first fluid medium consisting of isopentane (2.6 kg) and ethyl chloride (2.6 kg) were introduced to obtain a first mixture. The first mixture was cooled to −65° C. to obtain a cooled first mixture. Isobutylene monomer (4.0 kg) was introduced in the reactor and the reaction mixture was agitated at −65° C. and at an atmospheric pressure to obtain a first product mass comprising isobutylene isoprene rubber.

The polymerization was quenched by adding methanol (0.006 kg) to the first product mass to obtain a first resultant product mass. Hexane (7 kg) was added to the first resultant product mass to obtain a second resultant product mass.

Water (5 kg) was added to the second resultant product mass with continuous stirring and allowing the second resultant product mass to stand to obtain a biphasic mixture comprising an aqueous phase, and an organic phase containing isobutylene isoprene rubber, isopentane, ethyl chloride, unreacted isobutylene monomer, unreacted isoprene monomer and hexane. The aqueous phase was separated from the organic phase using settler vessel.

The separated organic phase was fed to a distillation column. Fractional distillation was carried out at 45° C. and at a pressure of 5 kg/cm$^2$ to obtain a distillate fraction comprising the unreacted isobutylene monomer, unreacted isoprene monomer and isopentane, ethyl chloride and a bottom fraction comprising tire isobutylene isoprene rubber and hexane. The distillate fraction and the bottom fraction were analyzed and the details are given below in Table 1. The separated unreacted monomers, isopentane, and ethyl chloride were re-introduced to the mixture of polymerization reactor.

TABLE 1

The concentrations of the unreacted monomers, isobutylene isoprene rubber and fluid media in organic phase for distillation, distillate fraction, and bottom fraction

| Compound Name | Organic Phase for Distillation | | Distillate Fraction | | Bottom Fraction | |
| --- | --- | --- | --- | --- | --- | --- |
| | Wt % | Kg | Wt % | Kg | Wt % | Kg |
| Isobutylene Monomer | 18.15 | 2.95 | 34.7 | 2.95 | | Nil |
| Isoprene Monomer | 0.5 | 0.08 | 0.94 | 0.08 | | Trace |
| Isopentane | 16.0 | 2.6 | 30.6 | 2.6 | | Trace |
| Ethyl Chloride | 16.0 | 2.6 | 30.6 | 2.6 | | Trace |
| Water | 0.12 | 0.02 | 0.24 | 0.02 | | Nil |
| Rubber | 6.15 | 1.0 | | | 13 | 1.0 |
| Hexane | 43.1 | 7.0 | 2.9 | 0.25 | 87 | 6.75 |
| Total | 100 | 16.25 | 100 | 8.5 | 100 | 7.75 |

It is evident from table 1 that fractional distillation separates the organic phase in a fraction comprising the isobutylene monomer, isoprene monomer, isopentane, ethyl chloride and water are collected at the top portion of the column (distillate fraction), and a bottom fraction comprising isobutylene isoprene rubber and hexane.

Since, unreacted monomers, and water were removed as distillate fraction, the so obtained bottom fraction was directly used for halogenation of isobutylene isoprene rubber without using the step of steam stripping of the organic phase and dissolution of the isobutylene isoprene rubber crumbs, obtained after steam stripping, in hexane.

B: Process for Halogenation

In halogenation reactor, the bottom fraction comprising the isobutylene isoprene rubber and hexane (obtained in step A of the present disclosure) was brominated using bromine (0.1 kg) at 45° C. for 25 minutes to obtain a second product mass containing crude mixture comprising brominated isobutylene isoprene rubber and hexane. The crude mixture was washed with sodium hydroxide, and with water, followed by steam stripping the washed crude mixture to obtain a mixture of brominated isobutylene isoprene rubber and water. The mixture of brominated isobutylene isoprene rubber and water was dried to obtain the brominated isobutylene isoprene rubber, having bromine content of 2.0%.

It is evident from step A and step B of the present disclosure that isobutylene isoprene rubber in hexane was obtained by fractional distillation of the organic phase. The isobutylene isoprene rubber in hexane was directly halogenated without subjecting the isobutylene isoprene rubber to the step of steam stripping, and subsequent dissolution in hexane. Therefore, the step of steam stripping for isolating isobutylene isoprene rubber and the step of dissolution of the isobutylene isoprene rubber crumbs obtained after the steam stripping were avoided.

Thus the step of steam stripping is required only once i.e., after the step of halogenation, which saves energy as well as reduces effluent production in the process. Since isobutylene isoprene rubber in hexane is directly subjected for halogenation, it reduces an amount of hexane required to perform both polymerization as well as halogenation steps.

As an estimate, the process of the present disclosure for preparing the halogenated isobutylene isoprene rubber saves 5% of the total project capital expenditure (CAPEX) and 25% of total operating cost per year in terms of energy saved.

Overall, the process of the present disclosure to produce brominated isobutylene isoprene rubber is simple, energy efficient, involves less expenditure and hence economical.

Technical Advances and Economical Significance

The present disclosure described herein above has several technical advantages including, but not limited to, the realization of a process for preparation of halogenated isobutylene isoprene rubber that is:
 an integrated process as steps of the polymerization and halogenation are carried out without isolation of isobutylene isoprene rubber;
 simple process; and
 energy efficient process and involves less expenditure, and hence economical process.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The embodiments herein and the various features and advantageous details thereof are explained with reference to the non-limiting embodiments in the following description. Descriptions of well-known components and processing techniques arc omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Throughout this specification the word "comprise", or variations such as "comprises" or "comprising", is understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or mote of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood tliat the foregoing descriptive matter is to be interpreted merely as illustrative of the disclosure and not as a limitation.

The invention claimed is:

1. A process for preparation of halogenated isobutylene isoprene rubber, said process comprising:
 a. polymerizing isoprene monomer in a first fluid medium with isobutylene monomer to obtain a first product mass comprising isobutylene isoprene rubber;
 b. quenching the polymerization by adding an alcohol to the first product mass to obtain a first resultant product mass;
 c. adding a second fluid medium to the first resultant product mass to obtain a second resultant product mass;
 d. adding water to the second resultant product mass with continuous stirring, and allowing the second resultant product mass to stand to obtain a biphasic mixture comprising an organic phase and an aqueous phase, wherein the organic phase comprises isobutylene isoprene rubber, the first fluid medium, unreacted isobutylene monomer, unreacted isoprene monomer, and the second fluid medium, and an aqueous phase comprises the alcohol;

e. separating the organic phase from the biphasic mixture;
f. fractionally distilling the separated organic phase to obtain a bottom fraction comprising the isobutylene isoprene rubber and the second fluid medium;
g. adding a halogenating agent to the bottom fraction and agitating to obtain a second product mass containing crude mixture comprising halogenated isobutylene isoprene rubber; and
h. subjecting the crude mixture to the step of washing, steam stripping, and drying to obtain halogenated isobutylene isoprene rubber.

2. The process as claimed in claim 1, wherein the step of polymerization comprises:
   i. introducing isoprene monomer, and at least one first fluid medium in a reactor to obtain a first mass;
   ii. cooling the first mass to a predetermined low temperature to obtain a cooled first mass; and
   iii. introducing isobutylene monomer in the reactor and agitating the reaction mass while maintaining the predetermined low temperature to obtain a first product mass comprising isobutylene isoprene rubber.

3. The process as claimed in claim 1, wherein step (a) is optionally carried out in the presence of a catalyst selected from the group consisting of diethylaluminum chloride and ethylaluminum dichloride.

4. The process as claimed in claim 1, wherein the first fluid medium is at least one selected from the group consisting of ethyl chloride, isopentane, and hexane.

5. The process as claimed in claim 1, wherein the alcohol is at least one selected from the group consisting of methanol and ethanol.

6. The process as claimed in claim 2, wherein the predetermined low temperature is in the range of −40° C. to −80° C.

7. The process as claimed in claim 1, wherein the second fluid medium is at least one selected from the group consisting of hexane and isopentane.

8. The process as claimed in claim 1, wherein the step of fractional distillation is carried out at a temperature in the range of 30° C. to 150° C. and at a pressure in the range of 3 kg/cm to 8 kg/cm.

9. The process as claimed in claim 1, wherein the halogenating agent is at least one selected from the group consisting of bromine ($Br_2$) and chlorine gas.

10. The process as claimed in claim 1, wherein the step of washing is carried out with at least one aqueous alkali selected from the group consisting of sodium hydroxide, potassium hydroxide, and sodium bishulphide.

* * * * *